Figure 1:
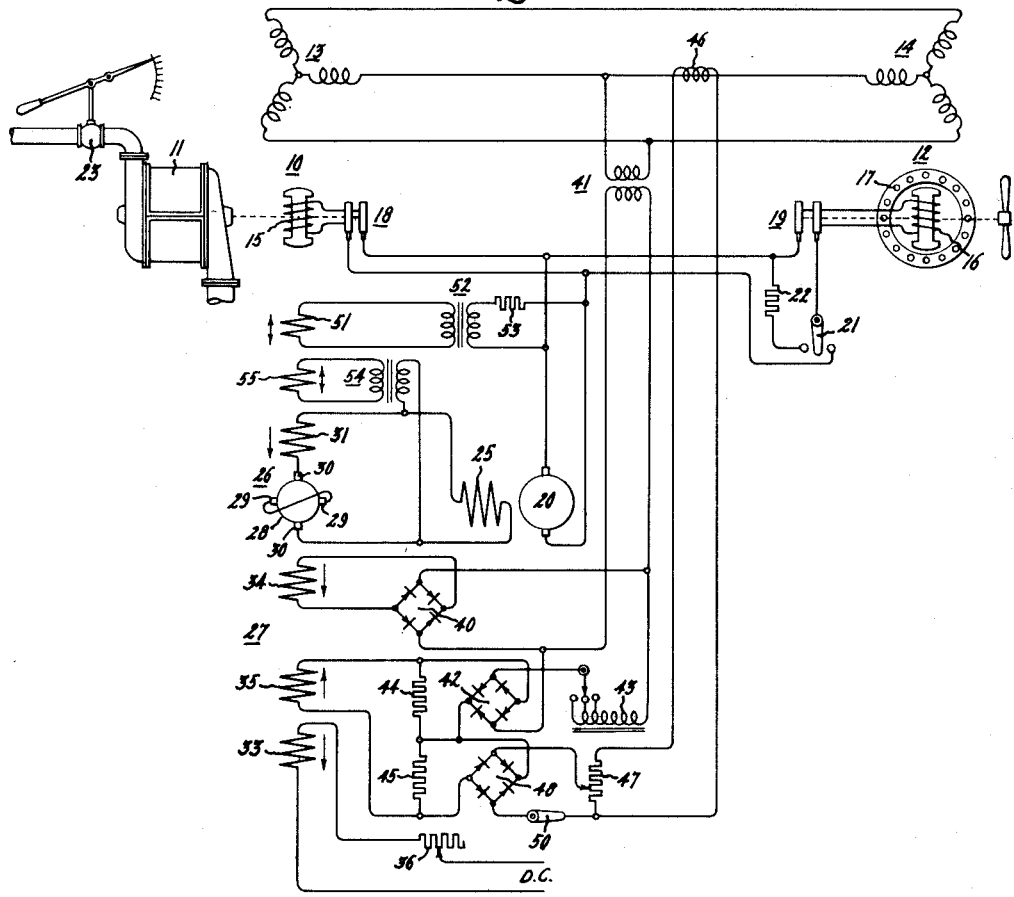

Aug. 29, 1944.   E. F. W. ALEXANDERSON   2,357,087
ELECTRIC SHIP PROPULSION SYSTEM
Filed Feb. 26, 1943

Inventor:
Ernst F. W. Alexanderson,
by Harry E. Dunham
His Attorney.

Patented Aug. 29, 1944

2,357,087

UNITED STATES PATENT OFFICE 2,357,087

ELECTRIC SHIP PROPULSION SYSTEM

Ernst F. W. Alexanderson, Schenectady, N. Y., assignor to General Electric Company, a corporation of New York Application February 26, 1943, Serial No. 477,259

9 Claims. (Cl. 172—8)

My invention relates to the control of variable speed synchronous motors for the propulsion of ships and more particularly to such control which makes possible stable operation of the synchronous motors and generators of a ship propulsion system under conditions providing substantially no normal torque margin.

Power systems employed for propelling ships are required to function within a wide range of speeds and loads and to withstand sudden changes of load. Electric power systems including synchronous generators and motors have been provided for ship propulsion, the various running speeds of the ship being obtained by changing the speed of the prime mover to vary the frequency of the generator and therefore the synchronous speed. It has been the practice in the past to operate such systems with a relatively wide normal torque margin so that the motors will not fall out of step under heavy load conditions, as during a high sea, or when a sudden load is applied, as in making a turn. Some types of ships require that the size and weight of the driving machinery be reduced to a minimum. When these requirements are met, it becomes extremely difficult to dissipate the heat generated in the field windings particularly under abnormal load conditions when it is necessary to increase the excitation to maintain stable operation. If it is attempted to maintain a wide torque margin by providing greater field excitation at normal loads in order to meet sudden demands, the continuous high excitation may result in objectionable heating of the machines. This additional excitation of the fields represents a loss in efficiency under normal load conditions. Furthermore, continuous high excitation requires that a larger excitation system be employed with consequent increase in weight. Accordingly, it is an object of my invention to provide an improved synchronous alternating current ship propulsion system which may be operated over a wide range of speeds and loads with a minimum normal torque margin.

It is another object of my invention to provide a power system for ship propulsion which includes a variable speed synchronous generator and a synchronous propeller driving motor and a control system for maintaining stability while operating the system with substantially no normal torque margin.

Further objects and advantages of my invention will become apparent as the following description proceeds, and the features of novelty which characterize my invention will be pointed out with particularity in the claims annexed to and forming a part of this specification.

Figure 2:
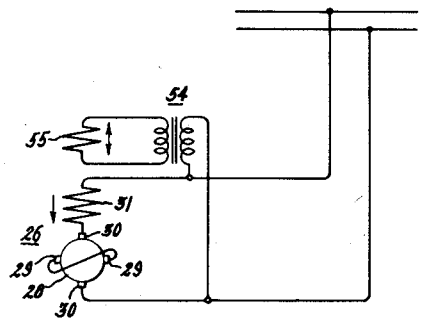
Figure 3:
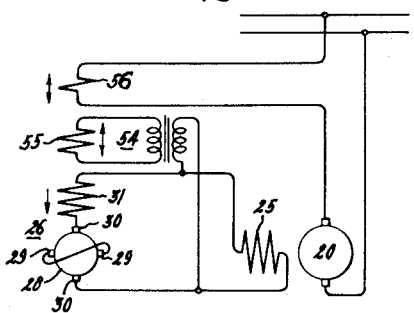

For a better understanding of my invention, reference may be had to the accompanying drawing in which Fig. 1 represents schematically a ship propulsion system embodying my invention, and Figs. 2 and 3 represent modifications of the system shown in Fig. 1.

Briefly, the ship propulsion system shown in Fig. 1 comprises an alternator driven by a variable speed turbine and arranged to supply power to a synchronous motor for driving the ship's propeller. The field windings of the motor and of the generator are supplied from a common excitation system including a main exciter, a pilot exciter for supplying the field of the main exciter and a regulator for controlling the operation of the pilot exciter. The main and pilot exciters are selected for high speed excitation and the regulator is arranged to be responsive to the angle of displacement between the rotors of the motor and generator in such a manner as to provide forced stability and maintain the motor and generator in synchronism throughout the range of operating loads of the system at all synchronous speeds so that the system may be operated with substantially no normal torque margin. The term "normal torque margin" is employed herein to designate continuous excess capacity at normal loads providing field excitation in addition to that required for maintaining the motor and generator in synchronism and which is available for maintaining synchronism upon a change in load. A stabilizing or anti-hunting control is provided which is energized in accordance with the rate of change of the aforesaid angle of displacement between the generator and motor. This renders the excitation system effective to maintain stable operation with substantially no normal torque margin under all operating loads. The operation of the excitation system is such as to introduce a forced stability of the generator and motor system such that field excitation in excess of that required need not be employed during normal operation and heating of the machinery is, therefore, minimized.

Referring now to the drawing, the ship propulsion system shown in Fig. 1 includes an alternating current generator 10 driven by a variable speed turbine 11 and arranged to supply power to a synchronous motor 12. The generator 10 includes stator windings 13 which have been indicated as directly connected to stator windings 14 of the motor; the usual line and reversing switches which would be employed having been omitted in the drawing. The rotor of the generator is provided with a field winding 15 and the rotor of the motor with a field winding 16. The rotor of the motor is also provided with a squirrel cage winding 17. The windings 15 and 16 are connected in parallel through sets of slip rings 18 and 19, respectively, and are connected across a main exciter 20. In order that the motor 12 may be started as an induction motor a switch 21 is provided to disconnect the motor field winding 16 and to short circuit it through a resistor 22. The turbine 11 is provided with a suitable speed controlling device which has been indicated as a manually operated throttle valve 23.

The exciter 20 is provided with a field winding 25 which is energized by a pilot exciter 26, and the desired stable characteristics of operation are obtained by controlling the exciter 26 through a regulator 27 which is responsive to electrical conditions of the motor-generator circuit. The pilot exciter 26 is a special direct current amplifying generator which for convenience is referred to herein as an Amplidyne. The Amplidyne 26 has a very high amplification ratio and a very low time constant and its output may be controlled by simple control circuits having no moving parts and substantially no time lag. The construction and operation of an Amplidyne generator are described in United States Letters Patent No. 2,227,992, granted January 7, 1941, to me jointly with Martin A. Edwards and assigned to the same assignee as the present invention. The Amplidyne consists essentially of a conventional direct current dynamo electric machine armature and commutator 28 provided with a set of short circuited brushes 29 whose commutating axis is directly in quadrature to the commutating axis of a set of load brushes 30. The main operating flux of the machine, that is to say, the flux which produces the generated electromotive force between the load brushes 30 is produced by the armature reaction of the current flowing between the short circuited brushes. A series field winding 31 is provided in the output circuit of the exciter 26 in order substantially to neutralize the normal armature reaction of the exciter. The resistance of the circulating path between the short circuited brushes is relatively low and the electromotive force for producing the flow of relatively heavy short circuit current which produces the large cross-armature-reaction flux is produced by magnetomotive forces resulting from the energization of control windings 33, 34 and 35. The total magnetomotive force produced by these control windings is relatively small. The control winding 33 is separately energized from a suitable source of direct current in series with a variable control resistor 36. The windings 34 and 35 are differentially connected boosting and bucking windings, respectively, which are energized by the regulator 27.

The regulator 27 includes a voltage responsive circuit having a linear impedance-current characteristic for energizing the boosting winding 34 and a second voltage responsive circuit having a non-linear impedance-current characteristic for energizing the bucking winding 35. A current responsive circuit is provided for modifying the energization of the winding 35 by opposing the voltage impressed upon the winding 35 by the non-linear circuit. The linear circuit comprises a rectifier 40 connected between the secondary of a potential transformer 41 and the winding 34 so that a boosting direct current is produced in the winding. The non-linear circuit comprises a rectifier 42 connected across the primary of the transformer 41 through an adjustable saturating reactor 43 and having a resistance 44 connected across its direct current output terminals. The resistance 44 is connected in series with a resistance 45 across the terminals of the winding 35 and the current responsive circuit is connected to produce across the resistance 45 a voltage opposing that produced across the resistance 44 by the non-linear circuit. The current responsive circuit comprises the secondary of a current transformer 46, connected in one of the motor lines and a variable resistance 47 across the terminals of a rectifier 48. The direct current output terminals of the rectifier 48 are connected across the resistance 45 in a direction to oppose the voltage across the resistance 44 produced by the rectifier 42. A switch 50 is provided between the rectifier 48 and the resistance 47 so that the current responsive circuit may be cut out if desired.

The operation of the regulator 27 is such that the boosting and bucking effects of the control windings 34 and 35 maintain the voltage of the generator 10 at a value sufficient to saturate the reactor 43, and the current responsive circuit for the winding 35 operates to correct the voltage to be maintained in accordance with requirements caused by changes in the line current. With switch 50 open, regulator 27 controls the pilot exciter 26 to maintain a substantially constant ratio between the voltage and frequency of the generator 10. The operation of the regulator 27 is such that equilibrium is established between the boost and buck fields 34 and 35 such that their resulting ampere turns are just sufficient to excite the Amplidyne 26 to a value which causes the generator 10 to produce an alternating current voltage sufficient to saturate the reactor 43. Since the voltage at which the reactor saturates varies directly with frequency, the regulator will hold a constant ratio between the voltage and frequency of the generator.

Both the voltage and the current of the motor and generator provide an indication of the angle of displacement between their rotors, the angle tending to increase with load and causing a decrease in voltage and an increase in current. For some systems either the current or the voltage alone may be a sufficient indication of the angle of displacement to provide adequate regulation; in other systems it may be desirable to employ both current and voltage. A high speed excitation system such as that shown in Fig. 1 and including the Amplidyne 26 makes it possible to maintain extremely stable operation of the system and furthermore to operate the motor and generator with substantially no normal torque margin. It is also necessary, however, to provide an adequate damping force to prevent the regulator from causing "over-shooting" resulting in sustained oscillations which would cause the motor to fall out of step and drop the load. The damping force, in order to be effective, must be proportioned in accordance with the rate of change of the angle of displacement.

When there is a change in the angle of displacement between the generator and motor, transient currents are set up in their field windings 15 and 16 and produce a corresponding change in the exciter current and also a variation of exciter voltage. In order to provide the damping force for preventing sustained oscillations a control winding 51 on the Amplidyne exciter 26 is energized in accordance with changes in voltage across the exciter 20; a transformer 52 being connected across the exciter terminals and having its secondary connected to the winding 51. A resistance 53 is provided in the primary of the transformer 52 to limit the current flowing through the transformer primary. It is also preferable to provide a stabilizing winding responsive to the voltage produced by the Amplidyne across the exciter field 25, and the primary of the transformer 54 is connected across the winding 25 so that the variations in voltage across the winding 25 are impressed on a stabilizing control winding 55 connected to the secondary of the transformer 54. The stabilizing windings 51 and 55 introduce damping forces to prevent hunting and insure stable operation of the system over a wide range of speeds and loads without danger of setting up sustained oscillations which might cause the motor to fall out of step.

The windings 51 and 55 are, of course, connected to the secondaries of the transformers 52 and 54 respectively in such manner that the magnetomotive forces produced by the windings 51 and 55 oppose the changes appearing across the primaries of the transformers 52 and 54.

It is apparent from the foregoing that the propulsion system is controlled in accordance with the angle of displacement between the motor and generator in such a manner that the motor and generator may be operated with substantially no normal torque margin; and in order to prevent sustained oscillations and render the system stable, a damping force is provided which is responsive to the motor and generator field voltage and hence dependent upon the rate of change of the angle of displacement.

The modification illustrated in Fig. 2 differs from that shown in Fig. 1 in that the Amplidyne exciter 26 is connected directly to supply the motor and generator exciter fields, the Amplidyne 26 being made of sufficient capacity to supply the full field current of the windings 15 and 16 in parallel. It will be noted that the arrangement shown in Fig. 2 is such that the series compensating winding 31 of the Amplidyne is in series with the fields 15 and 16 in parallel. The winding 31 in this arrangement is preferably made to overcompensate for the normal armature reaction of the exciter 26. The variations in field current then produce a stabilizing field control flux in proportion to the rate of change in the angle between the motor and generator and it is unnecessary to provide an additional stabilizing winding such as the winding 51 in Fig. 1.

The arrangement shown in Fig. 3 is also similar to that shown in Fig. 1 but differs from that shown in Fig. 1 in that a stabilizing winding 56 connected in series with the exciter 26 and energized in accordance with the exciter current is provided instead of the voltage responsive winding 51. The normal exciter current flowing through the winding 56 provides flux cooperating with the flux produced by the series winding 31 and somewhat overcompensating for the normal armature reaction of the Amplidyne exciter 26, and the variations in the current of the exciter 26 flowing through the winding 56 provide a damping force proportional to the rate of change of the displacement angle of the motor and generator as represented by the motor and generator field current.

It is readily apparent from the foregoing that a regulation and stabilization control has been provided for electric ship propulsion systems which does not involve moving parts such as regulator contacts. The regulator 27 operates in a manner such that there is a minimum time delay between the detection of a change in operating conditions and the supplying of excitation to meet the demands of the change. The motor and generator may be maintained in synchronism in spite of wide and sudden changes of load even though the system provides substantially no normal torque margin. The damping effect produced in accordance with the rate of change in the angle of displacement prevents the setting up of sustained oscillations and the stability of the system for operation on practically no normal torque margin is maintained over a wide range of loads within the range of synchronous speeds of the motor. The application of this control system is, obviously, not limited to motor and generator combinations having very low excess heat dissipating capacity, because the efficiency of systems having substantial excess capacity may be increased by regulation to maintain the minimum field current necessary for stable operation. It is obvious that the Amplidyne exciter 26 may be connected to supply excitation in other ways employed in common practice. For example, the Amplidyne may be arranged as a buck and boost exciter in cooperation with the main exciter or it may be arranged in combination with the main exciter as a counter E. M. F. generator.

Because the control described above makes it unnecessary to provide continuous excitation for the motor and generator fields above that necessary at a given time for normal operation, that is, since it is possible to operate the system with practically no normal torque margin, the heating of the motor and generator fields is minimized and lighter equipment may be employed than has been employed in systems heretofore built and which require substantial torque margin for stable operation.

While I have shown and described my invention in connection with a particular ship propulsion system, other applications will readily be apparent to those skilled in the art. I do not, therefore, desire my invention to be limited to the particular arrangements shown and described and I intend in the appended claims to cover all modifications within the spirit and scope of my invention.

What I claim as new and desire to secure by Letters Patent in the United States is:

1. An electric ship propulsion system comprising a variable speed synchronous generator and a synchronous propeller driving motor, means including a high speed exciter and dependent upon the angle of displacement between said generator and said motor for producing forced stability under all operating loads, and means dependent upon the rate of change of said angle and modifying the operation of said exciter for producing a damping force to prevent sustained oscillations between said motor and said generator whereby said system may be operated with substantially no normal torque margin at all operating loads.

2. An electric ship propulsion system comprising a variable speed synchronous generator and a synchronous propeller driving motor, field windings for said motor and said generator, means including a common high speed exciter for said windings and dependent upon the angle of displacement between said generator and said motor for producing forced stability under all operating loads, and means dependent upon the rate of change of said angle and modifying the operation of said exciter for producing a damping force to prevent sustained oscillations between said motor and said generator whereby said system may be operated with substantially no normal torque margin at all operating loads.

3. An electric ship propulsion system comprising a variable speed synchronous generator and a synchronous propeller driving motor, field windings for said motor and said generator, means including a common high speed exciter for said windings and dependent upon the angle of displacement between said generator and said motor for producing forced stability under all operating loads, said means including means for maintaining a substantially constant ratio between the voltage and frequency of said gen- change of said angle and modifying the opera- erator, and means dependent upon the rate of tion of said exciter for producing a damping force to prevent sustained oscillations between said motor and said generator whereby said system may be operated with substantially no normal torque margin at all operating loads.

4. An electric ship propulsion system comprising a variable speed synchronous generator and a synchronous propeller driving motor, field windings for said generator and said motor, a common excitation system for said windings, means dependent upon the angle of displacement between said generator and said motor and controlling said excitation system to provide forced stability for maintaining synchronism under all operating loads, and means dependent upon the rate of change of said angle and modifying the operation of said first mentioned means for producing a damping force to prevent sustained oscillations between said motor and said generator whereby said system may be operated with substantially no normal torque margin under all operating loads and at all operating speeds.

5. An electric ship propulsion system comprising a variable speed synchronous generator and a synchronous propeller driving motor, field windings for said motor and said generator, means including a cross-armature-reaction-excited direct current exciter for energizing said windings, a series field on said exciter for neutralizing the normal armature reaction of said exciter, means including control field windings on said exciter and dependent upon the angle of displacement between said generator and said motor for operating said exciter to produce forced stability under all operating loads, and means including a control field winding on said exciter energized in response to the rate of change of said angle for producing a damping force to prevent sustained oscillations between said motor and said generator whereby said system may be operated with substantially no normal torque margin at all operating loads.

6. An electric ship propulsion system comprising a variable speed alternating current generator and a synchronous propeller driving motor connected to said generator, field windings for said generator and said motor, means including a cross-armature-reaction-excited direct current exciter for energizing said field windings, a series field winding on said exciter for substantially neutralizing the normal armature reaction of said exciter, first and second and third control field windings on said exciter, means for energizing said first control winding from a source of direct current to determine the polarity of said exciter, and means for differentially energizing said second and third windings to maintain a substantially constant ratio between the voltage and frequency of said generator at all loads and throughout the range of frequencies of said generator.

7. An electric ship propulsion system comprising a variable speed alternating current generator and a synchronous propeller driving motor connected to said generator, field windings for said generator and said motor, means including a cross-armature-reaction-excited direct current exciter for energizing said field windings, a series field winding on said exciter for substantially neutralizing the normal armature reaction of said exciter, first and second and third control field windings on said exciter, means responsive to the voltage of said generator and having a linear impedance-current characteristic for energizing said first control winding to provide a boosting field, means responsive to the voltage of said generator and having a non-linear impedance current characteristic for energizing said second control winding to buck said first control winding, means dependent upon the line current of said generator for opposing the energization of said second winding, said first and second windings cooperating to provide forced stability of said motor at all loads, and means dependent upon the rate of change of the angle of displacement of said motor and generator for energizing said third winding to produce a damping force for preventing sustained oscillations of said motor and said generator.

8. An electric ship propulsion system comprising a variable speed alternating current generator and a synchronous propeller driving motor connected to said generator, field windings for said generator and said motor, means including a cross-armature-reaction-excited direct current exciter for energizing said field windings, a series field winding on said exciter for substantially neutralizing the normal armature reaction of said exciter, first and second and third control field windings on said exciter, means differentially energizing said first and second windings and dependent upon the angle of displacement between the motor and said generator for maintaining said motor and generator in synchronism under all operating loads, and means dependent upon the rate of change of said angle for energizing said third control winding to provide a damping force for preventing sustained oscillations of said motor and said generator whereby said system is operated with substantially no normal torque margin.

9. An electric ship propulsion system comprising a variable speed synchronous generator and a synchronous propeller driving motor, field windings for said motor and said generator, means including a main exciter and a pilot exciter for energizing said windings, said pilot exciter being a cross-armature-reaction-excited direct current machine, a series field on said pilot exciter for neutralizing the normal armature reaction of said pilot exciter, means including control field windings on said pilot exciter and dependent upon the angle of displacement between said generator and said motor for operating said exciter to produce forced stability under all operating loads, and means including a control field winding on said pilot exciter connected in series with said main exciter for increasing the effect of said neutralizing series field and for producing a damping force dependent upon variations in the current in said motor and generator field windings whereby said system may be operated with substantially no normal torque margin.

ERNST F. W. ALEXANDERSON.

CERTIFICATE OF CORRECTION.

Patent No. 2,357,087.  August 29, 1944.

ERNST F. W. ALEXANDERSON.

It is hereby certified that error appears in the printed specification of the above numbered patent requiring correction as follows: Page 4, first column, lines 14 and 15, claim 3, strike out "change of said angle and modifying the operaerator, and means dependent upon the rate of" and insert instead -- erator, and means dependent upon the rate of change of said angle and modifying the opera- --; and that the said Letters Patent should be read with this correction therein that the same may conform to the record of the case in the Patent Office.

Signed and sealed this 24th day of October, A. D. 1944.

Leslie Frazer (Seal) Acting Commissioner of Patents.